United States Patent
Tateishi et al.

(10) Patent No.: US 9,289,828 B2
(45) Date of Patent: Mar. 22, 2016

(54) BALL SCREW AND A METHOD FOR MANUFACTURING THE SAME

(75) Inventors: Koji Tateishi, Iwata (JP); Hirakazu Yoshida, Iwata (JP)

(73) Assignee: NTN Corporation, Osaka-shi (JP)

( * ) Notice: Subject to any disclaimer, the term of this patent is extended or adjusted under 35 U.S.C. 154(b) by 383 days.

(21) Appl. No.: 12/609,191

(22) Filed: Oct. 30, 2009

(65) Prior Publication Data

US 2010/0043582 A1 Feb. 25, 2010

Related U.S. Application Data

(63) Continuation of application No. PCT/JP2008/001077, filed on Apr. 24, 2008.

(30) Foreign Application Priority Data

May 1, 2007 (JP) .................................. 2007-120661

(51) Int. Cl.
| | |
|---|---|
| *F16H 25/20* | (2006.01) |
| *B23B 27/06* | (2006.01) |
| *B23P 15/00* | (2006.01) |
| *C21D 1/06* | (2006.01) |
| *C21D 7/06* | (2006.01) |
| *C21D 9/40* | (2006.01) |
| *C23C 8/22* | (2006.01) |
| *F16C 29/06* | (2006.01) |
| *F16C 33/64* | (2006.01) |
| *F16H 55/22* | (2006.01) |
| *F16H 25/24* | (2006.01) |

(52) U.S. Cl.
CPC .............. *B23B 27/065* (2013.01); *B23P 15/003* (2013.01); *C21D 1/06* (2013.01); *C21D 7/06* (2013.01); *C21D 9/40* (2013.01); *C23C 8/22* (2013.01); *F16C 29/0688* (2013.01); *F16C 33/64* (2013.01); *F16H 55/22* (2013.01); *F16H 2025/2481* (2013.01); *Y10T 29/49881* (2015.01); *Y10T 74/19744* (2015.01)

(58) Field of Classification Search
CPC .................. F16H 2025/2481; Y10T 74/19744
USPC ........................................ 384/424.81, 424.82
See application file for complete search history.

(56) References Cited

U.S. PATENT DOCUMENTS 4,386,973 A * 6/1983 Kawka et al. ................. 148/223

FOREIGN PATENT DOCUMENTS

| JP | 06-249317 | | 9/1994 |
|---|---|---|---|
| JP | 2003-207015 | * | 7/2003 |
| JP | 2005-83549 | * | 3/2005 |
| JP | 2005-090570 | | 4/2005 |
| JP | 2005-299721 | * | 10/2005 |
| JP | 2006-021307 | | 1/2006 |

(Continued)

*Primary Examiner* — William C Joyce
(74) *Attorney, Agent, or Firm* — Harness, Dickey & Pierce, P.L.C.

(57) ABSTRACT

A ball screw has a nut formed with a helical ball rolling groove on its inner circumference. A screw shaft is formed with a helical ball rolling groove on its inner circumference. The screw shaft is inserted into the nut. A number of balls are rollably contained within a ball rolling passage formed by oppositely arranged helical ball rolling grooves of the nut and the screw shaft, respectively. The nut is made of case hardened steel. The ball rolling groove is formed by cutting and surface hardening, by vacuum carburizing hardening, without any after-processing.

3 Claims, 5 Drawing Sheets

(56) References Cited

FOREIGN PATENT DOCUMENTS

| | | |
|---|---|---|
| JP | 2006-022848 | 1/2006 |
| JP | 2006-283931 | 10/2006 |
| JP | 2006-349058 | 12/2006 |
| JP | 2007-071279 | 3/2007 |
| JP | 2008-241012 | 10/2008 |

* cited by examiner

BALL SCREW AND A METHOD FOR MANUFACTURING THE SAME

CROSS-REFERENCE TO RELATED APPLICATIONS

This application is a continuation of International Application No. PCT/JP2008/001077, filed Apr. 24, 2008, which claims priority to Japanese Application No. 2007-120661, filed May 1, 2007. The disclosures of the above applications are incorporated herein by reference.

FIELD

The present disclosure relates to ball screws formed with a helical ball rolling groove with a large number of rolling balls used for power steering apparatus, electric actuators, etc. and a method of manufacturing the same.

BACKGROUND

A ball screw is a mechanical element that includes a ball screw shaft and a ball screw nut. The shaft is formed with a helical ball rolling groove on its outer circumferential surface. The ball screw nut is formed with a helical ball rolling groove on its inner circumferential surface. A number of balls are rollably contained within a ball rolling passage formed by the oppositely arranged helical ball rolling grooves. The ball screw is adapted to convert a rotational motion of the ball screw shaft or the ball screw nut into an axial translational motion of the ball screw nut or the ball screw shaft.

Usually, the ball rolling groove of the ball screw nut is formed by cutting and grinding its inner circumferential surface. Firstly, a prepared bore is formed in a blank by drilling. The helical ball rolling groove is formed on its circumferential surface of the prepared bore by cutting with the use of a turning tool. After performing a heat treatment, such as carburizing hardening, an outer circumference of the blank is ground by a cylindrical grinding machine. Finally, the surface of the ball rolling groove formed by cutting is ground with a grinding stone.

Recently, in ball screw used in automobile actuators, various kinds of ball screws have been proposed to satisfy the demands to reduce the price of the ball screws. As shown in FIG. 7, one example has been proposed for a manufacturing method of a ball screw nut. It includes a step of drilling a predetermined inner circumference (bore) at the center of a blank (step P1). A step to finish outer and inner circumferences of the blank with the use of a turning tool (step P2). A step to insert a tapping tool into the inner circumference and cut the ball rolling groove thereon (step P3). A step to heat treat (carburizing hardening) the ball rolling groove to form a predetermined hardened layer (step P4). A step to shot peen, with steel beads, after the heat treatment (step P5).

Adoption of this prior art manufacturing method eliminates grinding of the ball rolling groove using a conventional grinding wheel. Thus, this reduces the manufacturing cost. In addition, it also eliminates the generation of abnormal layers such as a grain boundary oxidation layer on the surface of the ball rolling groove by using the shot peening process. Also, it improves surface characteristics such as surface hardness and residual compression stress etc. giving influences to the life of the ball screw. (Japanese Laid-open Patent Publication No. 90570/2005.)

However, a problem exists in that regions of the ball rolling groove cannot be directly struck by media, such as steel beads, used in the shot peening process during its performance, as schematically shown in FIG. 8. Thus, it is necessary to eject media again in a reverse direction of ejection. This additional ejecting process not only increases the manufacturing cost but also causes differences in the surface characteristics between regions struck twice by the media and regions struck only once by the media. Thus, a deterioration in accuracy of the ball rolling groove occurs.

SUMMARY

It is, therefore, an object of the present disclosure to provide a ball screw and a method for its manufacture that reduces the generation of grain boundary oxidation layers and has improved durability.

To achieve the object, a ball screw comprises a nut formed with a helical ball rolling groove on its inner circumference. A screw shaft is formed with a helical ball rolling groove on its outer circumference. The shaft is inserted into the nut. A number of balls are rollably contained within a ball rolling passage formed by the oppositely arranged helical ball rolling grooves of the nut and the screw shaft, respectively. The nut is made of case hardened steel. The ball rolling groove is formed by cutting and surface hardening by vacuum carburizing hardening, without any after-processing.

The nut is made of case hardened steel. The ball rolling groove is formed by cutting. The ball rolling groove is surface hardened by vacuum carburizing hardening without any after-processing. Thus, it is possible to maintain a surface condition of a white-silver color after the hardening treatment similar to that before the hardening treatment and to discharge oxidation components. Thus, no abnormal surface structure and softened layer is generated with suppressing generation of the grain boundary layer as compared with ordinary gas carburizing. Accordingly, it is possible to provide a ball screw with improved resistance against fatigue and wear and has excellent durability.

The screw shaft is made from case hardened steel. The ball rolling groove is formed by rolling. It is surface hardened by vacuum carburizing hardening without any after-processing. This makes it possible to provide a ball screw with improved resistance against fatigue and wear and has excellent durability.

A method of manufacturing a ball screw comprises forming a nut with a helical ball rolling groove on its inner circumference. A screw shaft is formed with a helical ball rolling groove on its outer circumference. The shaft is inserted into the nut. A number of balls are rollably contained within a ball rolling passage that is formed by oppositely arranged helical ball rolling grooves of the nut and the screw shaft, respectively. The nut is made of case hardened steel. The ball rolling groove is formed by the steps of cutting, with use of a universal turning tool, and hardening, by vacuum, carburizing hardening.

Adoption of the method of the present disclosure makes it possible to suppress the generation of abnormal surface structures, such as a grain boundary oxidation layer and softened layer, as compared with ordinary gas carburizing. Thus, this improves resistance against fatigue and wear. In addition, shot peening performed after heat treatment enables the elimination of processes for improving surface roughness such as grinding. Additionally, it applies residual compression stress and thus obtains stable quality while reducing the total cost.

The whole configuration of the ball rolling groove is formed by using a universal turning tool with a cutting edge of its nose radius being smaller than a radius of curvature of the ball rolling groove. To form the nut ball rolling groove, the universal turning tool is moved several times by an effective length of the ball rolling groove and by successively shifting, each time, the moving path of the universal turning tool along a circular arc direction of a cross-sectional configuration of the ball rolling groove. This makes it possible to assure a desirable dimension and accuracy, a good surface roughness and eliminates a grinding or cutting process after heat treatment. Thus, this reduces the manufacturing cost.

The ball rolling groove is processed by shot blasting or a tumbler treatment after vacuum carburizing hardening. This makes it possible to effectively remove burrs generated by the cutting process in the ball rolling groove.

The ball screw comprises a nut formed with a helical ball rolling groove on its inner circumferential surface. A screw shaft is formed with a helical ball rolling groove on its outer circumferential surface. The shaft is inserted into the nut. A number of balls are rollably contained within a ball rolling passage formed by oppositely arranged helical ball rolling grooves of the nut and the screw shaft, respectively. The nut is made of case hardened steel. The ball rolling groove is formed by cutting. Its surface is hardened by vacuum carburizing hardening without any after-processing. Thus, it is possible to maintain a surface condition of a white-silver color after the hardening treatment similar to before the hardening treatment and to discharge oxidation components. Thus, no abnormal surface structure and softened layer is generated with suppressing generation of the grain boundary layer as compared with ordinary gas carburizing. Accordingly, it is possible to provide a ball screw with improved resistance against fatigue and wear that has excellent durability.

In the method for manufacturing a ball screw, a nut is formed with a helical ball rolling groove on its inner circumferential surface. A screw shaft is formed with a helical ball rolling groove on its outer circumferential surface. The shaft is inserted into the nut. A number of balls are rollably contained within a ball rolling passage formed by oppositely arranged helical ball rolling grooves of the nut and the screw shaft, respectively. The nut is made of case hardened steel. The ball rolling groove is formed by the steps of cutting, with the use of a universal turning tool, and hardening, by vacuum carburizing hardening. Thus, it is possible to suppress the generation of abnormal surface structure, such as grain boundary oxidation layer and a softened layer as compared with ordinary gas carburizing. Thus, this improves resistance against fatigue and wear. In addition, the shot peening performed after heat treatment enables the elimination of processes to improve surface roughness. Additionally, it applies residual compression stress and thus obtains stable quality and reduces the total cost.

A method for manufacturing a ball screw comprises a nut formed with a helical ball rolling groove on its inner circumferential surface. A screw shaft is formed with a helical ball rolling groove on its outer circumferential surface. The shaft is inserted into the nut. A number of balls are rollably contained within a ball rolling passage formed by oppositely arranged helical ball rolling grooves of the nut and the screw shaft, respectively. The nut is made of case hardened steel. The method comprises steps of boring, by drilling, a predetermined inner circumference at the center of a blank. The outer and inner circumferences of the blank are finished by a turning tool. The ball rolling groove is point-turned with the use of a universal turning tool. The turned work is hardened by vacuum carburizing hardening. The ball rolling groove is shot blasted after hardening.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

FIGS. 4(a)~(j) are enlarged cross-sectional views each showing a forming step of the ball rolling groove of the nut.

Figure 4:
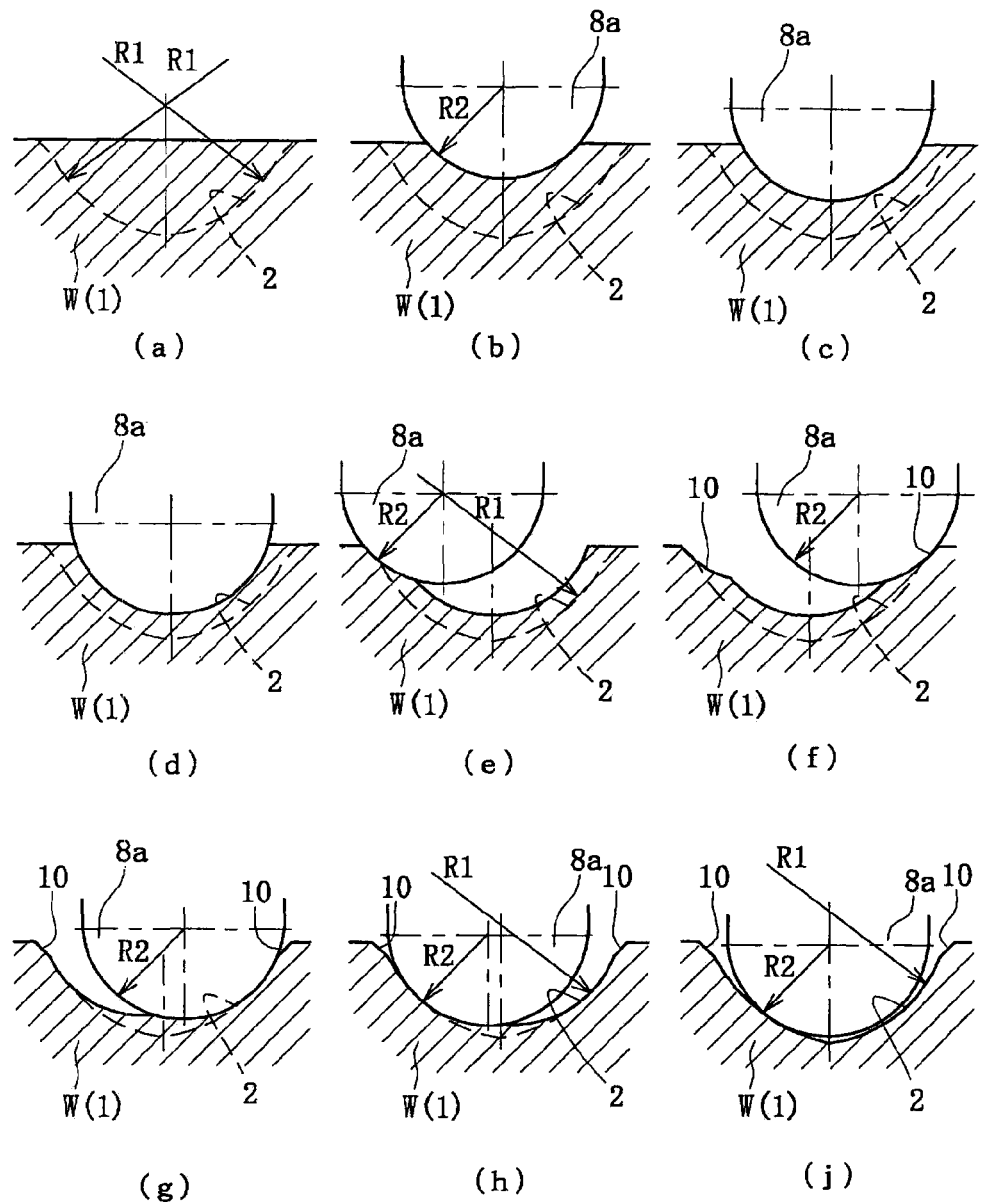
Figure 5:
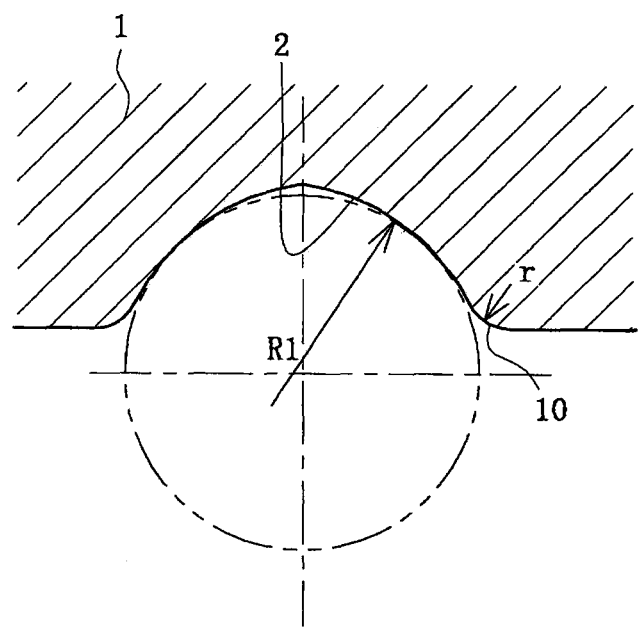

FIG. 5 is a partially enlarged view showing the ball rolling groove of FIG. 4.

Figure 6:
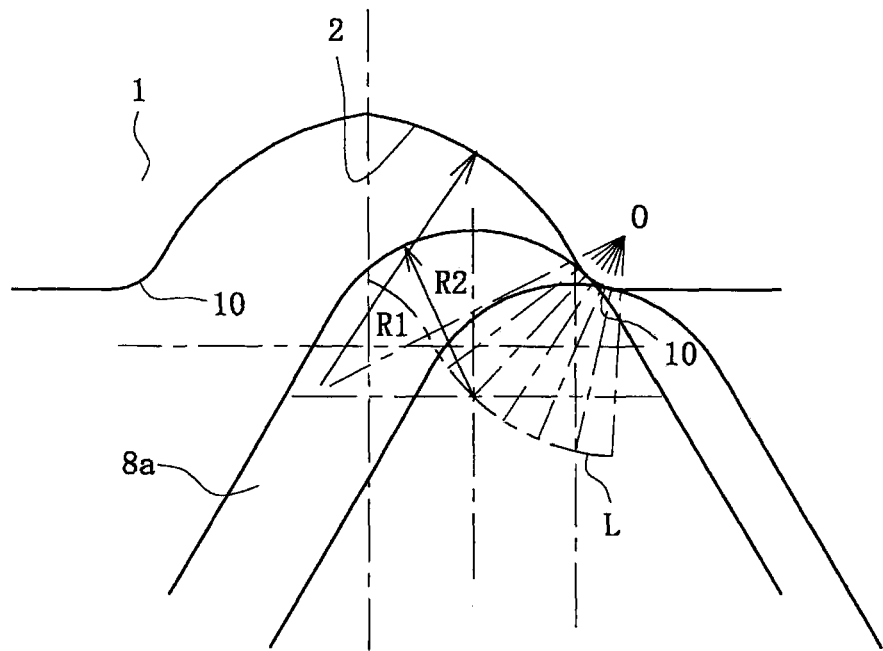

FIG. 6 is an explanatory view showing a cutting process of the shoulder of the ball rolling groove of FIG. 5.

Figure 7:
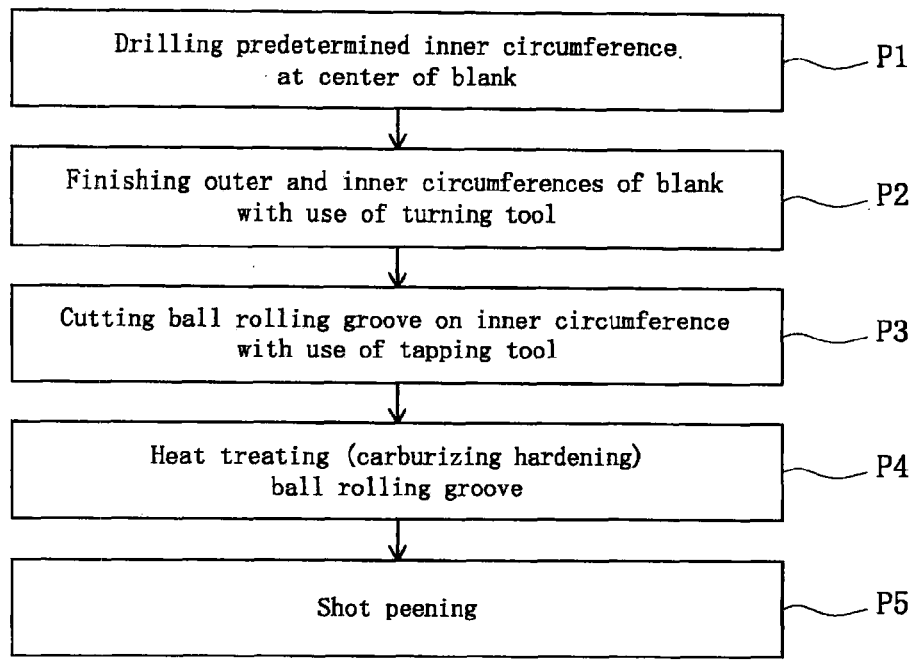

FIG. 7 is a process drawing showing manufacturing steps of the ball screw nut of the prior art.

Figure 8:
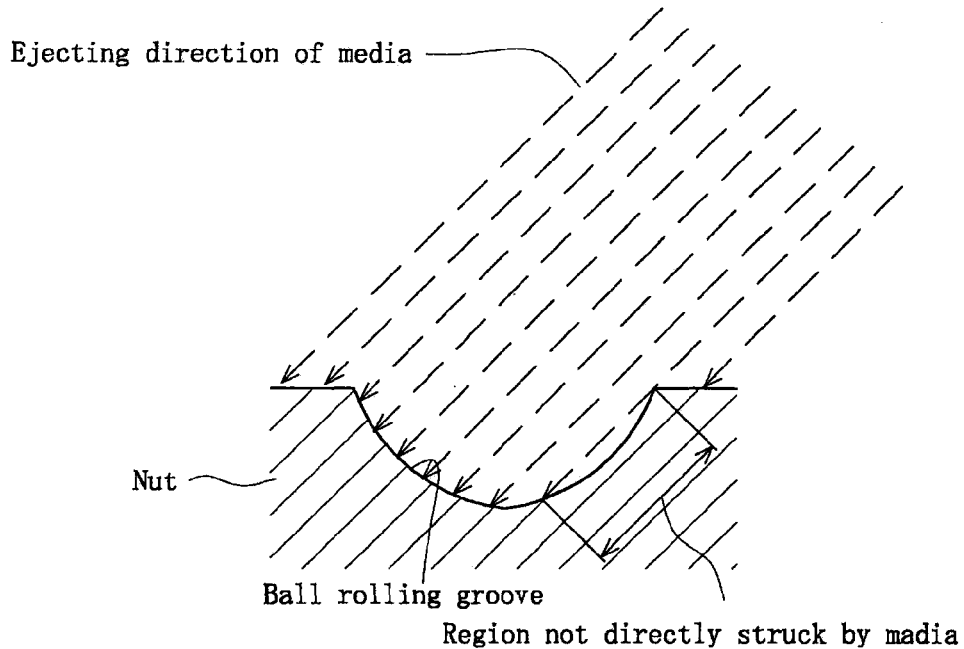

FIG. 8 is a schematic view showing the shot peening treatment of a nut of the prior art.

DETAILED DESCRIPTION

One preferred embodiments of the present disclosure will be described in detail with reference to accompanying drawings.

Figure 1:
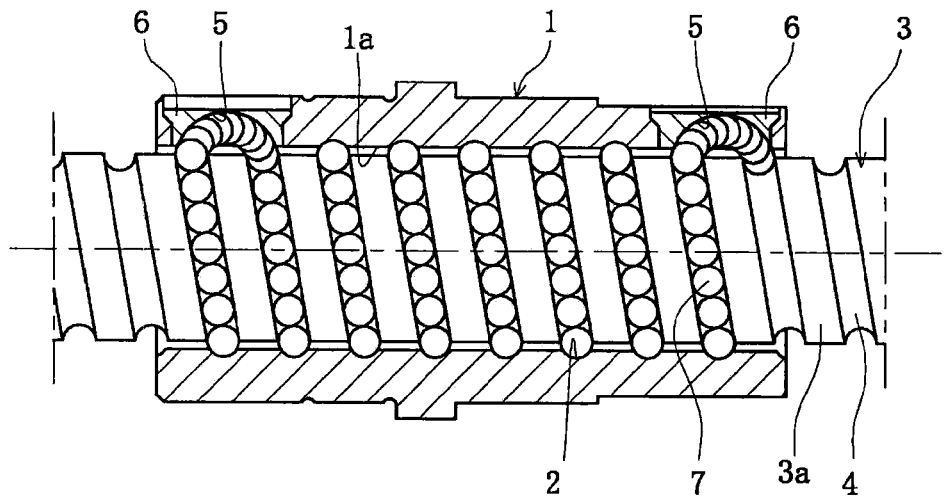
FIG. 1 is a longitudinal sectional view of one embodiment of a ball screw.

FIG. 1 is a longitudinal section view of one embodiment of a ball screw. The ball screw includes a nut 1 formed with a helical ball rolling groove 2 on its inner circumference 1a. A screw shaft 3 is formed with a helical ball rolling groove 4 on its outer circumference 3a. The screw shaft 3 is inserted into the nut 1. A ball rolling passage is formed by oppositely arranged screw grooves 2, 4. A bridge member 6 is formed with a connecting groove 5 connecting ball rolling grooves 2 of the nut 1. A number of balls 7 are rollably contained within the ball rolling passage, formed by oppositely arranged helical ball rolling grooves 2, 4. The balls 7 can be circulated in an endless manner by the bridge member 6.

The nut 1 and the screw shaft 3 are made of case hardened steel such as SCM430 etc. They are formed with ball rolling grooves 2, 4 by a point-turning process with use of a universal turning tool 8, described later more in detail. The system of ball circulation is not limited to the bridge member type and thus a return tube type or an end cap type may be used.

The ball rolling grooves 2, 4 are formed as so-called Gothic arc grooves formed by a combination of two circular arcs each having a slightly larger radius of curvature than the radius of balls 7. The cross sectional configuration of the ball rolling grooves 2, 4 may be a circular arc configuration. However, the Gothic arc configuration is preferable since it can set a large contacting angle against the ball 7 and a small axial gap. This enables an increase in rigidity against an axial load and thus suppresses vibration of the ball screw.

Figure 2:
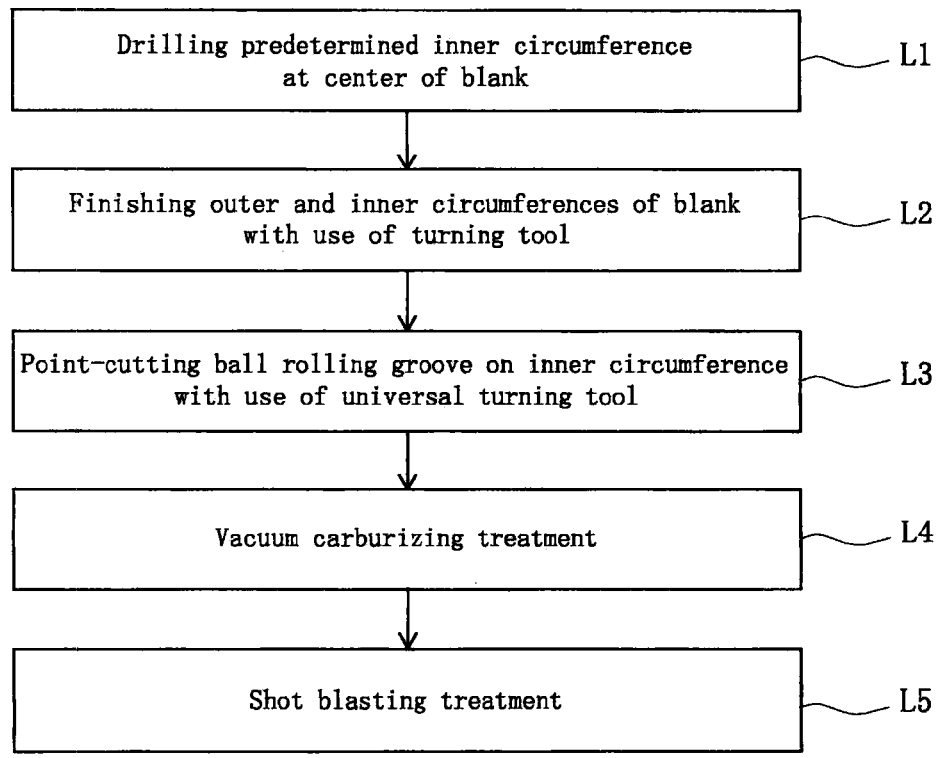
FIG. 2 is a process drawing showing manufacturing steps of the ball screw.

Steps of manufacturing the nut 1 of the present disclosure are shown in FIG. 2. First, a predetermined inner circumference 1a is formed by a drill, etc. at the center of a cylindrical blank (L1). An outer circumference and the inner circumference 1a of the blank are finished by a turning tool (L2). A universal turning tool 8 is inserted into the inner circumference 1a of the nut 1. The universal turning tool 8 point-cuts the inner circumference 1a with NC controlling respective phases (L3). The blank is heat treated by vacuum carburizing hardening (L4). The ball rolling groove 2 is shot blast treated (L5).

Figure 3:
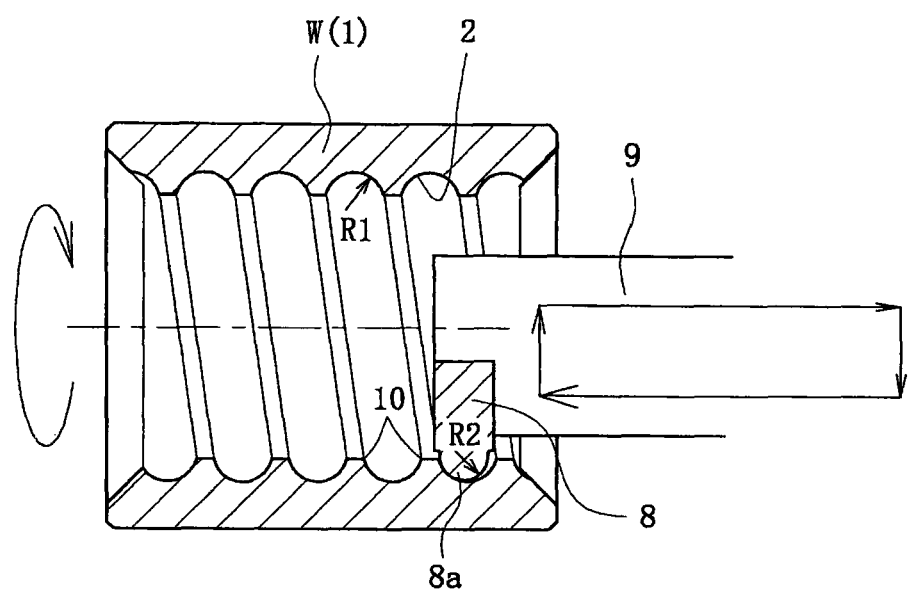
FIG. 3 is an explanatory view showing a forming process of the ball rolling groove of the nut of the ball screw.

As shown in FIG. 3, the point-cutting is performed by a universal turning tool 8 while holding a cylindrical work piece W(1) by a spindle chuck of a lathe (not shown) and turning it in a predetermined direction. The universal turning tool 8 is secured to a holder 9 and is movably supported both in radial and axial directions. The cutting is performed in accordance with a so-called point-cutting. The universal turning tool 8 has a nose radius R2 of its cutting edge 8a smaller than a radius of curvature R1 of the ball rolling groove 2. Thus, the formation of the ball rolling groove 2 is performed by moving the universal turning tool 8 several times by an effective length of the ball rolling groove 2 and by successively shifting, each time, the moving path of the universal turning tool 8 along a circular arc direction of a cross-sectional configuration of the ball rolling groove 2.

The forming process of the ball rolling groove 2 of the nut will be described in detail with reference to FIGS. 4(a)~4(j).

FIG. 4(a) shows a green pipe member before the turning process. A general configuration of the ball rolling groove 2 is formed by the cutting edge 8a of the universal turning tool 8 by feeding the cutting edge 8a successively from FIG. 4(b) to FIG. 4(d) toward an axial center of the work piece W(1). The dimension of the nose radius R2 of the cutting edge 8a is set substantially near the radius of curvature R1 of the ball rolling groove 2. Thus, it is possible to obtain a general configuration of the ball rolling groove 2 without axially moving the cutting edge 8a. Thus, this reduces the processing time.

The point-cutting can be started at a stage shown in FIG. 4(e) where the turning process of the ball rolling groove 2 has been proceeded to some extent. As shown in FIGS. 4(e)~4(j), a whole configuration of the ball rolling groove 2 is formed by moving cutting edge 8a of the universal turning tool 8 several times by an effective length of the ball rolling groove 2 and by successively shifting, each time, the moving path of the universal turning tool 8 along a circular arc direction of a cross-sectional configuration of the ball rolling groove 2. In this embodiment, the cutting edge 8a of the universal turning tool 8 does not interfere with a portion of the ball rolling groove 2 opposing the portion of the ball rolling groove 2 being processed even if the ball rolling groove 2 has a Gothic arc configuration. This is due to the nose radius R2 of the cutting edge 8a being set smaller than the radius of curvature R1 of the ball rolling groove 2.

As shown in FIG. 5, a shoulder 10 of the ball rolling groove 2 is formed with a circular arc configuration having a predetermined radius of curvature "r". The shoulder 10 is formed by the same universal turning tool 8 as that used for the point-cutting of the ball rolling groove 2. As shown in FIG. 6, the shoulder 10 is formed similarly to the point-cutting of the ball rolling groove 2. Thus, the center "O" of the curvature is positioned on an extension of the nose radius R2 by shifting the moving path several times during movement of the universal turning tool 8 along a central locus "L" of the nose radius R2 of the cutting edge 8a.

Accordingly, the ball rolling groove 2 can be formed by point-cutting with use of the universal turning tool 8. The universal turning tool 8 has the nose radius R2 of the cutting edge 8a smaller than the radius of curvature R1 of the ball rolling groove 2. The shoulder 10 can be continuously formed by the same universal turning tool 8 as that used for the point-cutting of the ball rolling groove 2. Thus, it is possible to complete the formation of the ball rolling groove 2 and the shoulder 10 by one step point-cutting and to smoothly form a transition between the ball rolling groove 2 and the shoulder 10. This also provides a ball screw nut 1 with improvements to the smooth circulation of the balls 7, excellent operability and a low manufacturing cost.

In addition, a hardened layer with a hardness of 55~62 HRC is formed by heat treatment on the surface of the ball rolling groove 2 after it has been formed by point-cutting. The heat treatment is performed by vacuum carburizing hardening where carburization and quenching are carried out under less oxygenated conditions. This maintains a surface condition of a white-silver color after the hardening treatment. This is similar to the surface condition before the hardening treatment. Additionally, this discharges oxidation components. Thus, no abnormal surface structure and softened layer is generated with suppressing the generation of the grain boundary layer as compared with ordinary gas carburizing. Accordingly, it is possible to provide a ball screw with improved resistance against fatigue and wear and has excellent durability. In addition, shot peening is performed after heat treatment. This eliminates processes to improve surface roughness. Also, shot peening applies residual compression stress. Thus, this obtains stable quality and reduces the total cost.

Results of a durability test of a ball screw, in accordance with the disclosure, performed by the applicant are shown in Tables 1 and 2. A specimen is a ball screw with a screw shaft diameter of 10 mm, a lead of 3 mm of the ball rolling grooves 2, 4, an outer diameter of 2.0 mm of the ball 7, a bridge circulation type, and two circulation rows. The ball rolling groove 4 of the screw shaft 3 is formed by rolling and vacuum carburizing hardened without any after process similarly to the ball screw nut 1.

The test was performed under conditions of: a double nut constant pressure type using a spring load; an axial load of 690 N; a rotational speed of 500 rpm; one-way stroke of 6 mm (reciprocal stroke 12 mm); a circumstance temperature of 100° C. under a blare heating system; and a total number of reciprocal motion of 200,000 ($4 \times 10^5$ rev).

TABLE 1

| Nut hardening | Nut No. | Appearance of nut | Expanded amount of gap (μm) |
|---|---|---|---|
| Ordinary gas carburizing | 1 | Slight peeling | 3.0 |
| | 2 | Slight peeling | 4.0 |
| | 3 | Slight peeling | 4.0 |
| | 4 | No peeling | 2.0 |
| Vacuum carburizing | 1 | No peeling | 1.0 |
| | 2 | No peeling | 1.5 |
| | 3 | No peeling | 1.0 |
| | 4 | No peeling | 0 |

TABLE 2

| Nut hardening | Nut No. | Appearance of screw shaft | Appearance of ball |
|---|---|---|---|
| Ordinary gas carburizing | 1 | No peeling | No peeling |
| | 2 | No peeling | No peeling |
| | 3 | No peeling | No peeling |
| | 4 | No peeling | No peeling |
| Vacuum carburizing | 1 | No peeling | No peeling |
| | 2 | No peeling | No peeling |
| | 3 | No peeling | No peeling |
| | 4 | No peeling | No peeling |

As apparent from Table 1, it has been found that in vacuum carburized nuts no peeling was generated. Also, the expanded amount of the gap was suppressed smaller than 1.5 μm or less as compared with the ordinary gas carburized nuts. The resistances against fatigue and wear were also improved. In addition as shown in FIG. 2, it is demonstrated that no abnormality, such as peeling, was not found in the screw shaft 3 and ball 7. Also, the vacuum carburized nuts is superior in durability to the ordinary gas carburized nuts.

The shot blasting treatment is applied to the ball rolling groove 2 after heat treatment. The shot blasting treatment is a process that performs a surface treatment by striking powdered abrasives onto metal, stone, wood, glass or resin etc. There are two types of shot blasting treatments. In one type, the abrasives are ejected by compressed air. In the other type, the abrasives are mechanically ejected by high speed rotational impeller etc. The air ejecting type is preferable since it enables pin point ejection. In addition there are various kinds and grain size of abrasives such as an alumina family, a steel family, a glass family etc. The steel family is used in the present disclosure.

The heat treatment is performed by the vacuum carburization. Thus, it is possible to eliminate the conventional shot peening treatment. In addition, it is possible to effectively remove burrs generated by the cutting process around the ball rolling groove 2 or the bridge aperture. This reduces the manufacturing cost of the ball screw and achieves smooth insertion of the bridge member 6 as well as smooth circulation of balls 7. Burrs may be removed by a tumbler treatment in place of the shot blasting treatment.

The ball screw of the present disclosure can be applied to an automatic transmission of vehicle, an electric-powered brake, electric-powered power steering, an engine valve control actuator, and also to an electric-powered shock absorber and an actuator for controlling a width between CVT pullies.

The present disclosure has been described with reference to the preferred embodiment. Obviously, modifications and alternations will occur to those of ordinary skill in the art upon reading and understanding the preceding detailed description. It is intended that the present disclosure be construed to include all such alternations and modifications insofar as they come within the scope of the appended claims or their equivalents.

What is claimed is:

1. A ball screw comprising:
   a nut formed with a helical ball rolling groove on its inner circumference;
   a screw shaft formed with a helical ball rolling groove on its outer circumference, said shaft inserted into the nut;
   a number of balls rollably contained within a ball rolling passage formed by oppositely arranged helical ball rolling grooves of the nut and the screw shaft, respectively; and
   the nut is made of case hardened steel, and that the ball rolling groove, a shoulder and a transition portion continuous with the ball rolling groove and shoulder, are cut by a single universal turning tool with a cutting edge so that the ball rolling groove shoulder and transition portion has a continuous point-cut surface, the universal turning tool cutting edge has a nose radius (R2) smaller than a radius (R1) of curvature of the ball rolling groove, the shoulder is cut by the same portion of the universal turning tool as that used for point-cutting of the ball rolling groove, the center of the curvature (O) of the shoulder is positioned on an extension of the nose radius (R2) by shifting a moving path of the universal tool several times during movement of the universal turning tool along a central locus (L) of the nose radius (R2) of the cutting edge, this enables one step point cutting by the same universal turning tool to cut the transition portion continuous with and between the ball rolling groove and shoulder during forming of the shoulder to form the shoulder with a circular arc configuration with a radius of curvature (r) different than (R1) and (R2), the shoulder and transition portion provides smooth circulation of the balls, the ball rolling groove and shoulder have a surface hardened by vacuum carburizing hardening, the shoulder and transition portion provide a curvature on the ball rolling groove that provide clearance for ejected media, during a shot blasting process, so that the media can be ejected in a single direction contacting the entire ball rolling groove so that the single shot blasting is used to provide the same surface characteristic across the entire ball rolling groove, this increases operability, and reduces manufacturing cost.

2. The ball screw of claim 1, wherein the screw shaft is made of case hardened steel, the ball rolling groove of the screw shaft is formed by rolling and surface hardening by vacuum carburizing hardening.

3. A ball screw comprising:
   a nut formed with a helical ball rolling groove on its inner circumference;
   a screw shaft formed with a helical ball rolling groove on its outer circumference, said shaft inserted into the nut;
   a number of balls rollably contained within a ball rolling passage formed by oppositely arranged helical ball rolling grooves of the nut and the screw shaft, respectively;
   the nut is made of case hardened steel, a shoulder is continuous with the ball rolling groove, a universal turning tool with a cutting edge, the shoulder of the ball rolling groove is formed with a circular arc configuration with a predetermined radius of curvature and that the ball rolling groove is formed by the universal turning tool cutting edge with nose radius being smaller than a radius of curvature of the ball rolling groove, the shoulder is formed by the same portion of the universal turning tool as that used for point-cutting of the ball rolling groove, this enables one step point cutting to form a transition between the ball rolling groove and shoulder during forming of the shoulder so that the ball rolling groove shoulder and transition portion has a continuous point-cut surface that provides smooth circulation of the balls, the center of the curvature of the shoulder is positioned on an extension of the nose radius (R2) by shifting a moving path of the universal tool several times during movement of the universal turning tool along a central locus (L) of the nose radius (R2) of the cutting edge, this enables one step point cutting by the same universal turning tool to cut the transition portion continuous with and between the ball rolling groove and shoulder during forming of the shoulder to form the shoulder with the circular arc configuration with the predetermined radius of curvature different than (R1) and (R2), the shoulder and transition portion provides smooth circulation of the balls, and surface hardening by vacuum carburizing hardening, the shoulder and transition portion provide a curvature on the ball rolling groove that provide clearance for ejected media, during a shot blasting process, so that the media can be ejected in a single direction contacting the entire ball rolling groove so that the single shot blasting is used to provide the same surface characteristic across the entire ball rolling groove, and where carburization and quenching are carried out under lower oxygen content conditions, this increases operability, and reduces manufacturing cost.

* * * * *